(No Model.)

G. NOLIN.
SHEEP SHEARS.

No. 266,716. Patented Oct. 31, 1882.

Witnesses.
S. N. Piper
E. B. Pratt

Inventor.
Gervais Nolin.
by R. H. Eddy atty.

UNITED STATES PATENT OFFICE.

GERVAIS NOLIN, OF SKOWHEGAN, MAINE.

SHEEP-SHEARS.

SPECIFICATION forming part of Letters Patent No. 266,716, dated October 31, 1882.

Application filed August 14, 1882. (No model.)

*To all whom it may concern:*

Be it known that I, GERVAIS NOLIN, of Skowhegan, in the county of Somerset, of the State of Maine, have invented a new and useful Improvement in Sheep-Shears; and I do hereby declare the same to be described in the following specification and represented in the accompanying drawings, of which—

Figure 3:
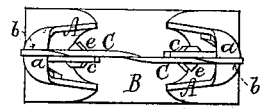
Figure 4:
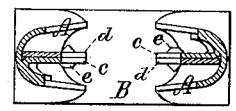
Figure 1:
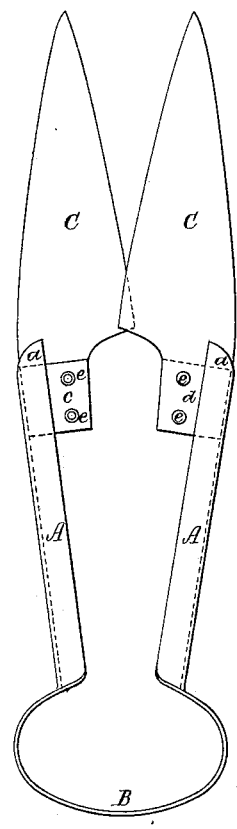
Figure 2:
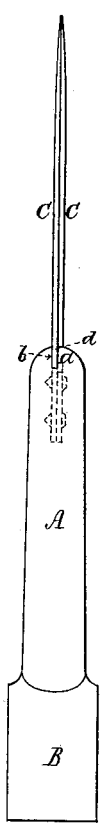
Figure 5:

Figure 1 is a front elevation, Fig. 2 an edge view, Fig. 3 a top view, and Fig. 4 a transverse section, of shears constructed in accordance with my invention, the nature of which is defined in the claims hereinafter presented. Fig. 5 is a transverse section of one of the handles.

The two handles A A of the shears, besides being connected at their lower ends by a bow-spring, B, are formed of sheet steel or metal, each being concavo-convex transversely throughout its length, except at its upper end, which is dome-shaped, as represented at *a*, the part *a* being notched transversely, as shown at *b*. Near such upper end of it each handle is furnished with a lip, *c*, projecting inward from it. The lip, arranged in the hollow of the handle and below the notch, does not project upward beyond the dome-shaped part of the handle, the lip consisting of a rectangular or square plate of metal bent as shown in Fig. 4, and brazed or welded or otherwise suitably fastened to the handle.

The two blades C C, formed as shown, have their shanks or lower parts, *d d*, inserted in the two notches *b b*, and arranged flatwise against the two lips *c c*, to which the said blades or shanks thereof are fastened by rivets *e e*, or by screws, if preferable, going through them and the lips.

From the above it will be seen that the blades are furnished with shanks to extend down from them into the notches and hollows of the handles, and that such handles, besides being dome-shaped and notched at their upper ends, have within their hollows the lips to support the blade-shanks, all of which differs materially from the usual mode heretofore practiced of making shears, in which each blade extended from a stop projecting laterally from it at its lower end, and being in one piece with the blade and the hollow handle. By having each of the handles dome-shaped and notched at top, in manner as represented, not only does it present a better finish and sustain the blade to better advantage, but when the blade is in place in the handle the upper end of the handle becomes closed, so as to operate to prevent wool, when the shears are in use, from working into the handle. One blade-shank is applied to one side of its lip, the other blade-shank being applied to the opposite side of the other lip, as represented in Fig. 4.

I am aware that it is not new to make shear-blade handles concavo-convex transversely and open at their upper ends, and to have the blades fastened to them, as shown in the United States Patent No. 72,735, or to flat arms projecting upward from such handles, as shown in the United States Patent No. 175,269, and therefore I do not claim such, there being important differences between such and my invention.

What I claim is—

1. The improved shear-handles, concavo-convex transversely, and dome-shaped and notched at their upper ends, and provided with lips arranged within them and below the notches, as set forth.

2. The shear-handles, dome-shaped and notched at their upper ends, and provided with lips arranged within them, as described and represented, in combination with the blades, provided with shanks arranged in the notches and against the lips of the handles, and secured to such lips by means essentially as set forth.

GERVAIS NOLIN.

Witnesses:
R. H. EDDY,
S. N. PIPER.